United States Patent [19]
van der Lely et al.

[11] Patent Number: 5,957,081
[45] Date of Patent: Sep. 28, 1999

[54] AUTOMATIC MILKING AND MILK COOLING APPARATUS

[75] Inventors: Ary van der Lely, Maasland, Netherlands; Olaf van der Lely, Steinhausen, Switzerland; Karel van den Berg, Bleskensgraaf; Rene Fransen, Vlaardingen, both of Netherlands

[73] Assignee: Maasland N.V., Maasland, Netherlands

[21] Appl. No.: 08/507,196

[22] PCT Filed: Jan. 22, 1994

[86] PCT No.: PCT/NL94/00013

§ 371 Date: Jun. 28, 1996

§ 102(e) Date: Jun. 28, 1996

[87] PCT Pub. No.: WO94/16552

PCT Pub. Date: Aug. 4, 1994

[30] Foreign Application Priority Data

Jan. 26, 1993 [NL] Netherlands ............................ 9300143

[51] Int. Cl.⁶ ..................................................... A01J 5/011
[52] U.S. Cl. .......................................................... 119/14.09
[58] Field of Search ............................. 119/14.01, 14.02, 119/14.08, 14.09

[56] References Cited

U.S. PATENT DOCUMENTS

| | | | |
|---|---|---|---|
| 2,794,420 | 6/1957 | Recchia | 119/14.18 |
| 2,865,391 | 12/1958 | Duncan | 137/205 |
| 2,873,722 | 2/1959 | Duncan et al. | 119/14.09 |
| 3,554,166 | 1/1971 | Belden | 119/159 |
| 4,034,714 | 7/1977 | Umbaugh et al. | 119/14.18 |
| 4,432,700 | 2/1984 | Icking | 417/121 |
| 4,970,989 | 11/1990 | Lidman | 119/14.01 |
| 5,052,341 | 10/1991 | Woolford et al. | 119/14.02 |
| 5,080,040 | 1/1992 | van der Lely et al. | 119/14.09 |
| 5,085,172 | 2/1992 | Borgman et al. | 119/14.09 |
| 5,195,456 | 3/1993 | van der Lely et al. | 119/14.09 |
| 5,272,997 | 12/1993 | van der Lely et al. | 119/14.08 |
| 5,275,124 | 1/1994 | van der Lely et al. | 119/14.08 |
| 5,568,788 | 10/1996 | van der Lely et al. | 119/14.02 |

FOREIGN PATENT DOCUMENTS

| | | |
|---|---|---|
| 0 519 544 A1 | 12/1992 | European Pat. Off. . |
| 284 398 | 6/1989 | Germany . |
| 910092 | 1/1993 | Netherlands . |
| 2 104 368 | 3/1983 | United Kingdom . |
| 2 194 830 | 3/1988 | United Kingdom . |

*Primary Examiner*—Thomas Price
*Attorney, Agent, or Firm*—Penrose Lucas Albright

[57] ABSTRACT

An Apparatus for automatically milking animals, such as cows, by a milking robot which is connected to a refrigerated milk reservoir and controlled by a computer system. After emptying and cleaning the milk reservoir, cooling of the reservoir is automatically activated when the computer system senses that a predetermined amount of milk has entered the reservoir via the milking robot. An automatic cleansing system for the milking apparatus and an automatically replaceable milk filters are also disclosed.

38 Claims, 5 Drawing Sheets

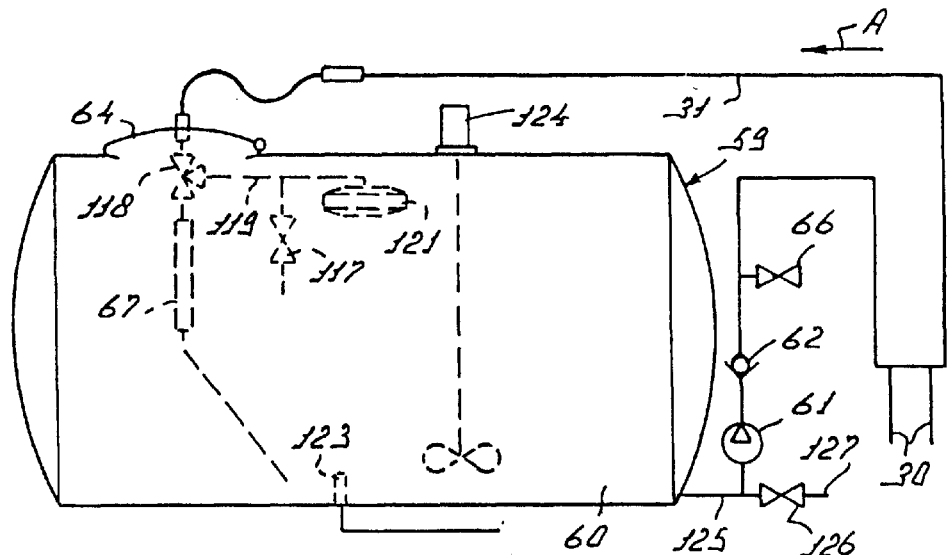
FIG. 4
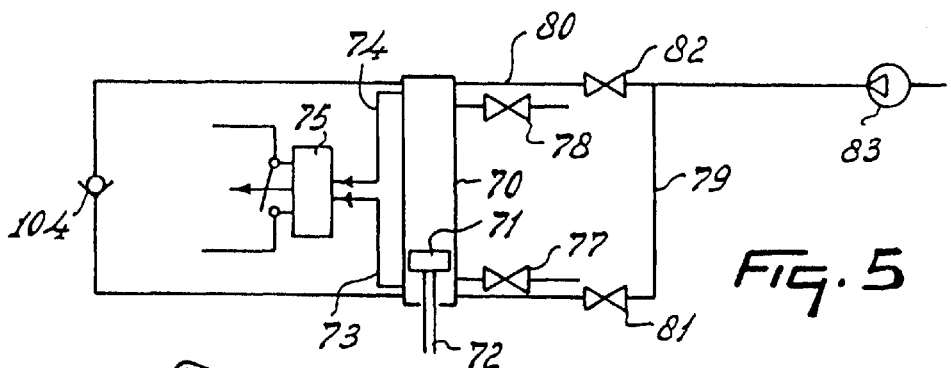
FIG. 5
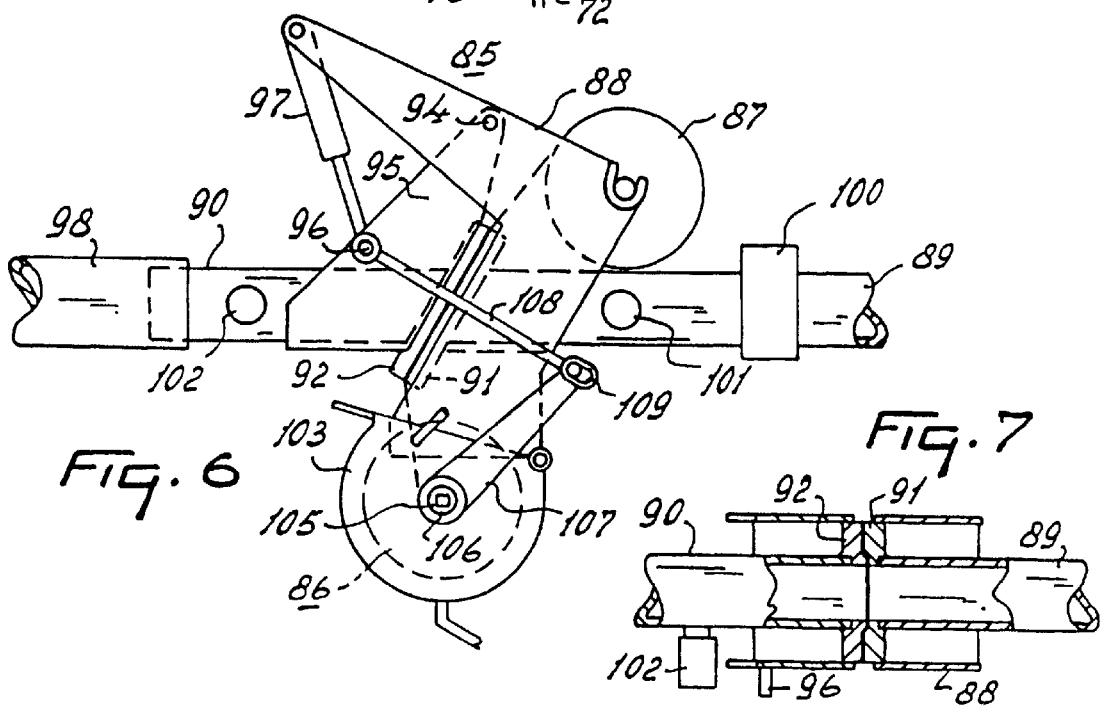
FIG. 6
FIG. 7

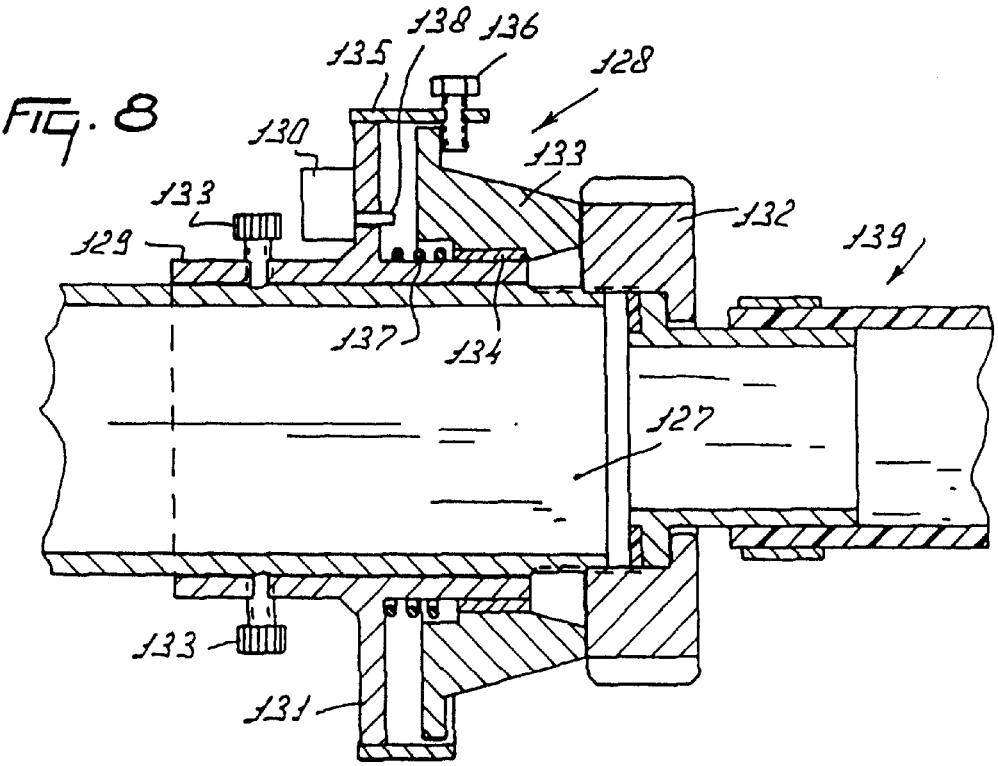
Fig. 8
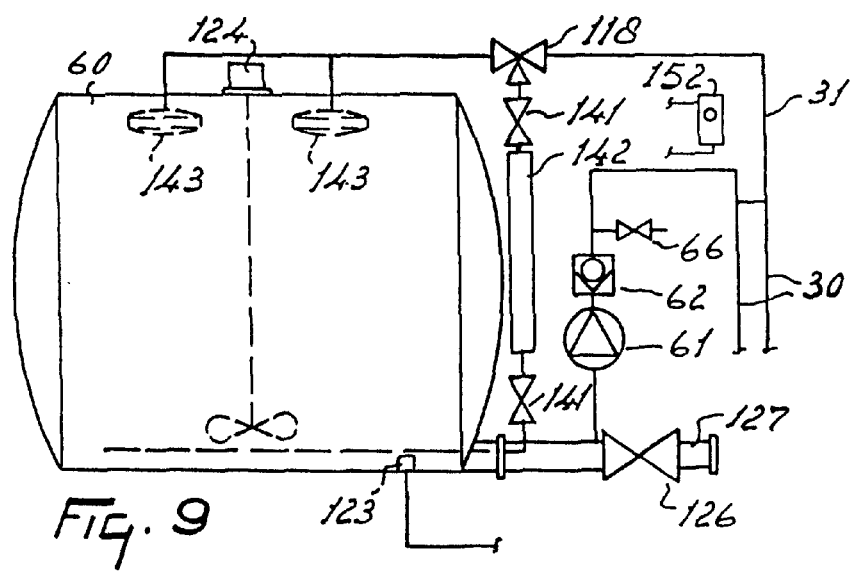
Fig. 9
Fig. 10

AUTOMATIC MILKING AND MILK COOLING APPARATUS

RELATED FOREIGN APPLICATION DATA

Priority of Netherlands Application No. 9300143, filed Jan. 26, 1993 (also filed subsequently as an International Application under the Patent Cooperation Treaty on Jan. 21, 1994, indicating the United States as a designated state, International Application No. PCT/NL94/00013 and the International Publication No. WO94/16552) is claimed.

FIELD OF THE INVENTION

The invention relates to an apparatus for automatically milking of animals, such as cows, by means of a milking robot, including an automatic milking system and means for automatically connecting and disconnecting teat cups to and from the teats of an animal, the apparatus further comprising a reservoir for storing and cooling milk obtained by the milking robot and a computer controlling the milking and cooling process.

BACKGROUND OF THE INVENTION

Automation for milking animals, such as cows, is disclosed in numerous published articles and prior art patents.

For example, European Patent Application No. 0 385 539 discloses a system wherein animals can approach and be received by a milking robot freely for milking; in contrast to conventional milking, wherein the animal are, within a short period of time, usually milked twice a day, the automatic milking occurring randomly, spread over the day. Thus, a shorter or longer period may occur between two milkings of the same animal. The milk is stored in a refrigerated bulk milk tank. After the tank has been cleaned, or in any event has been emptied, there is a danger that when milk is next received in the tank it will be over-cooled and frozen.

British Patent Specification No. GB-A-1 266 870, which relates to a bulk milk tank, mentions the problem of milk freezing. As a solution, this document suggests to switch on, automatically, a further cooling element within the tank when milk in the tank has reached a certain level. This is accomplished by a sensing device, comprising a probe for sensing the level of the milk in the tank causing a further refrigerating unit to operate under the control of a thermostat. Further units are brought into operation as the corresponding refrigerated plates in the tank become substantially submerged in the milk. This British Patent Specification does not deal with the problem of milk being over-cooled when it initially enters an empty bulk milk tank nor does it reveal how and when the first cooling element of the tank is put into operation.

Therefore, although the dairy farm industry has long recognized the need to chill the milk obtained by a milking robot, under certain circumstances, known cooling processes do not perform satisfactory in that the milk may be over-cooled or frozen.

SUMMARY OF THE INVENTION

According to the invention, after the emptying and possibly cleaning of the reservoir, the cooling of the milk in the reservoir is automatically activated when it has become sensed by the computer system of the milking robot that a predetermined amount of milk has entered the reservoir via the milking robot.

According to an embodiment of the invention, the cooling of the reservoir can be activated after a predetermined number of cows has been milked by the milking robot. According to another embodiment of the invention, the amount of milk is measured outside the reservoir and the determination of the amount of milk passed to the reservoir is accomplished by the computer on the basis of, e.g., the amount of milk measured by a milk meter of the robot. According to yet another embodiment of the invention, the milk tank includes a level sensor which can supply a signal to the process computer associated with the apparatus, which signal is related to the milk level, whereas on the basis of such signal the cooling device of the tank is activated by the process computer.

The invention further relates to a milking apparatus, including a recirculating line in which a milk tank and a pump for circulating the milk through the tank and through the recirculating line are incorporated. The apparatus, comprising one or a plurality of supply lines, to each of which a milking plant may have been connected, incorporates a milk filter in the recirculating line and/or in a supply line. Such an apparatus renders it possible to keep the milking plant compact and, more specifically, the storage portion thereof with the milk tank and the recirculating line, can be made suitable for combining it with a contemporary, automated milking plant.

In an embodiment according to the invention, the milk filter is included between the recirculating line end via which the milk is discharged into the tank and a supply line connected to that end. Such a construction renders it possible to provide that a single milk filter will serve more than one milking apparatus. In a further embodiment, the apparatus is designed so that the supply line of a milking plant is connected to the recirculating line between the non-return valve and the filter. Such a design ensures that the freshly milked milk passes always through the filter before it arrives in the milk tank.

In an embodiment of the invention, the recirculating line includes a valve which in a first position opens a connection to a line portion incorporating the discharging end of the recirculating line and in a second position to a line portion comprising a spray head. Such a construction renders it possible to clean in an advantageous manner the milk tank with the aid of the recirculating line by, in accordance with the invention, having the ends of the spray heads in the top portion of the tank and the line portion discharging the milk in the lower portion of the milk tank, wherein it is avoided that the milk will mix with air. Excessive mixing of the milk with air results in decomposition of the fat molecules and, consequently, the milk turns sour and rancid. Therefore, the present invention also comprises a milking apparatus having a milk tank provided with a milk supply line, to which a milking plant is connectable, wherein the milk supply line includes a valve which in a first position opens a connection to a line portion having an end which freely discharges in the tank, and in a second position to a line portion provided with one or more spray heads. In this situation it is advantageous for a spray head to be located in the upper part of the milk tank, preferably near the upper wall of the tank, while the free end discharges near the bottom of the tank to provide a flow for the milk without, to the extent possible, mixing it with air.

According to the invention, the filter, which is designed as a tubular filter, can be in a position both inside and outside the tank. In the first case, the tubular filter may be connected to the lid of the tank, so that after lifting the lid the filter can be exchanged in a simple manner. In a second embodiment, in which the tubular filter is arranged outside the tank, a valve has been accommodated in the line, before the filter (taken in the direction of flow). This valve can be operated both manually and by means of a computer, whereas a similar type of valve, or a non-return valve, as the case may be, is accommodated in the line behind the filter. This prevents milk present before the filter from flowing from the recirculating line during an exchange of the tubular filter. The non-return valve, behind the tubular filter, prevents milk from escaping from the milk tank in accordance with the communicating vessel-principle.

In a further embodiment in accordance with the invention, at or near the line portion in which the filter is incorporated, means are present with the aid of which the process computer, controlling the milking apparatus, can sense the necessary replacement of the filter. This results, in accordance with the invention, that given processes in the milking apparatus, such as the operative state of the circulation pump of the recirculating line and emptying of the collecting glass of a milking plant, are respectively protected and postponed during replacing the filter. Such a provision renders it possible to replace the filter in an advantageous manner. In a further embodiment in accordance with the invention, the recirculating line is split, at least for a part thereof, into two line portions, in each of which a filter is incorporated and wherein the bifurcation is realized with the aid of a valve which in a first position can pass the milk flow along both milk filters and in a second and a third position passes the milk only along one of the two milk filters. In this milking arrangement, a milk filter can be exchanged without the need for interrupting the operation of the milking plant and/or the circulation pump of the recirculating line. Since the milk can flow along both milk filters, milk will not be stagnant for a long period of time during normal operation in either of the two branches.

In another embodiment, which is generally aimed at preventing an interruption of the milk plant and/or the circulation pump, the bifurcation in the line may be formed by a valve which in a first position releases a connection to a first filter and in a second position to a second filter.

The invention therefore also relates to an apparatus comprising a recirculating line, in which a milk tank and a pump for circulating the milk through the tank and the recirculating line are incorporated, wherein the recirculating line is bifurcated into two parallel extending line portions, in each of which a filter is incorporated, and this bifurcation is formed by a valve which in a first position releases a connection to one line portion and in a second position a connection to the other line portion.

According to the invention, in a still further embodiment, the milk filter is accommodated in a process computer-activated device for automatically renewing the filter. In such an embodiment neither the circulation pump, nor the connected milking plant need to be stopped for renewal of the filter; furthermore no intervention of the farmer is required. The invention therefore also relates to a milking arrangement including a milking plant, wherein the milk, when discharged from the milking plant (for example to a milk tank) passes a milk filter accommodated in a process computer-activated device for automatically renewing the filter. Such an apparatus for automatically renewing the filter is advantageously incorporated for an automated milking robot. According to the invention, such a filter is renewed by moving the filter in a sectional plant of a milk line, more particularly in a direction transversely to line portions which are movable with respect to each other and which are fitted with a flange for the purpose of clamping and guiding the filter. Because of the very small thickness of the filter, and because of the small amount of additional space required during moving of the filter, such a construction is eminently suitable for incorporation in a supply line of the milk storage apparatus. In a different embodiment in accordance with the invention, such an automated device for moving the filter is accommodated in a milk line which is connected to the teat cup. More in particular, such a device is accommodated in each one of the separate milk lines which are connected via a teat cup to a quarter of the udder of a milk animal. This increases the filter surface area, provides a feature to detect irregularities in each of the quarters separately and keeps the connections as compact as possible. In such a device the facing planes of the flanges are coated with an elastic material and the line portions are pivotal relative to each other by means of a pivotal shaft which is arranged so that the device is pivotal about a shaft projecting from the contact plane of the flanges. In this situation the filter is capable of being wound around bobbins which are provided on facing sides of the relevant milking apparatus and can be controlled and driven by means of motors and from the process computer.

A still further feature of the invention consists in that the collecting glass of a milking plant is connected substantially directly to the recirculating line of a milk storage plant. For that purpose the recirculating line is guided, in accordance with the invention, at least substantially underneath the collecting glass. Arranged between the collecting glass of a milking plant and the recirculating line there may be present, in accordance with the invention, a valve and/or a discharge pump which may be connected to a supply line of the recirculating line; the collecting glass and valve and/or discharge pump and the recirculating line being at least substantially immediately contiguous to each other.

The invention further includes all embodiments and/or arrangements specified in the claims and/or the description of the present application.

BRIEF DESCRIPTION OF THE DRAWINGS

For a better understanding of the invention and to show how the same may be carried into effect, reference will now be made, by way of example, to the accompanying drawings.

FIG. 4 is a schematic representation of a milk storage implement in accordance with the invention;

FIG. 5 is a schematic representation of the circuit to prevent the robot arm, in accordance with the present invention, from being overloaded in the vertical direction;

FIG. 6 is a side view of a portion of the milking apparatus, in accordance with the invention, for automatically renewing the milk filter;

FIG. 7 is a cross-sectional plan view taken on the line VII—VII in FIG. 6;

FIG. 8 is a cross-sectional view of a detection device on the discharge outlet for the milk storage construction;

FIG. 9 is a schematic survey of a milk storage construction, a milk filter having been accommodated at the exterior side of the milk tank in the recirculating line; and FIG. 10 is a schematic representation of an alternative for a milk filter construction, such as shown, for example, in FIG. 9.

Corresponding components in the drawings have been given the same reference numerals. The invention is not limited to the embodiments depicted and described here; they only serve as an illustration of the inventive idea.

DETAILED DESCRIPTION OF THE PREFERRED EMBODIMENTS

Figure 1:
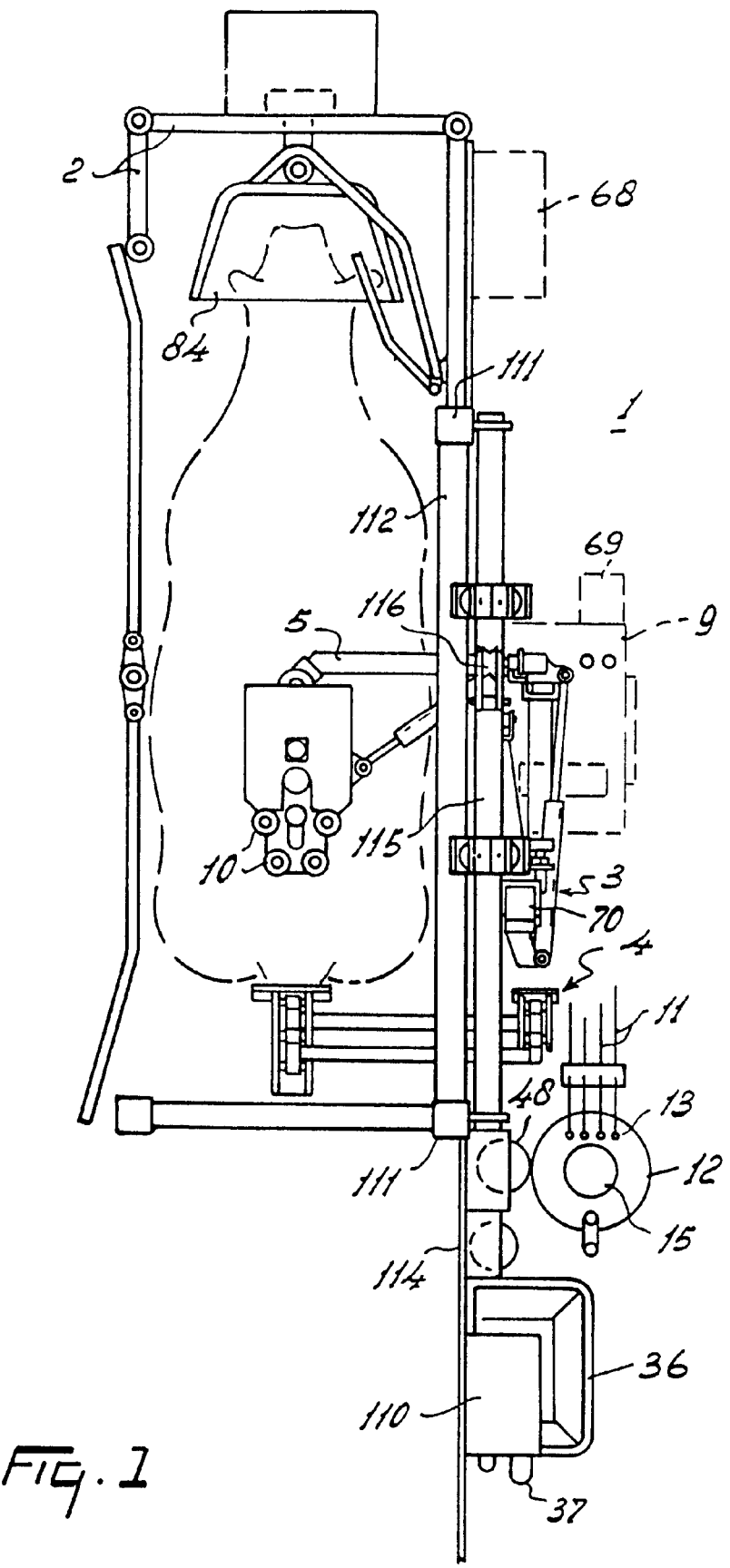
FIG. 1 is a plan view of a schematic lay-out of a milking construction for milking cows in accordance with the invention.
Figure 2:
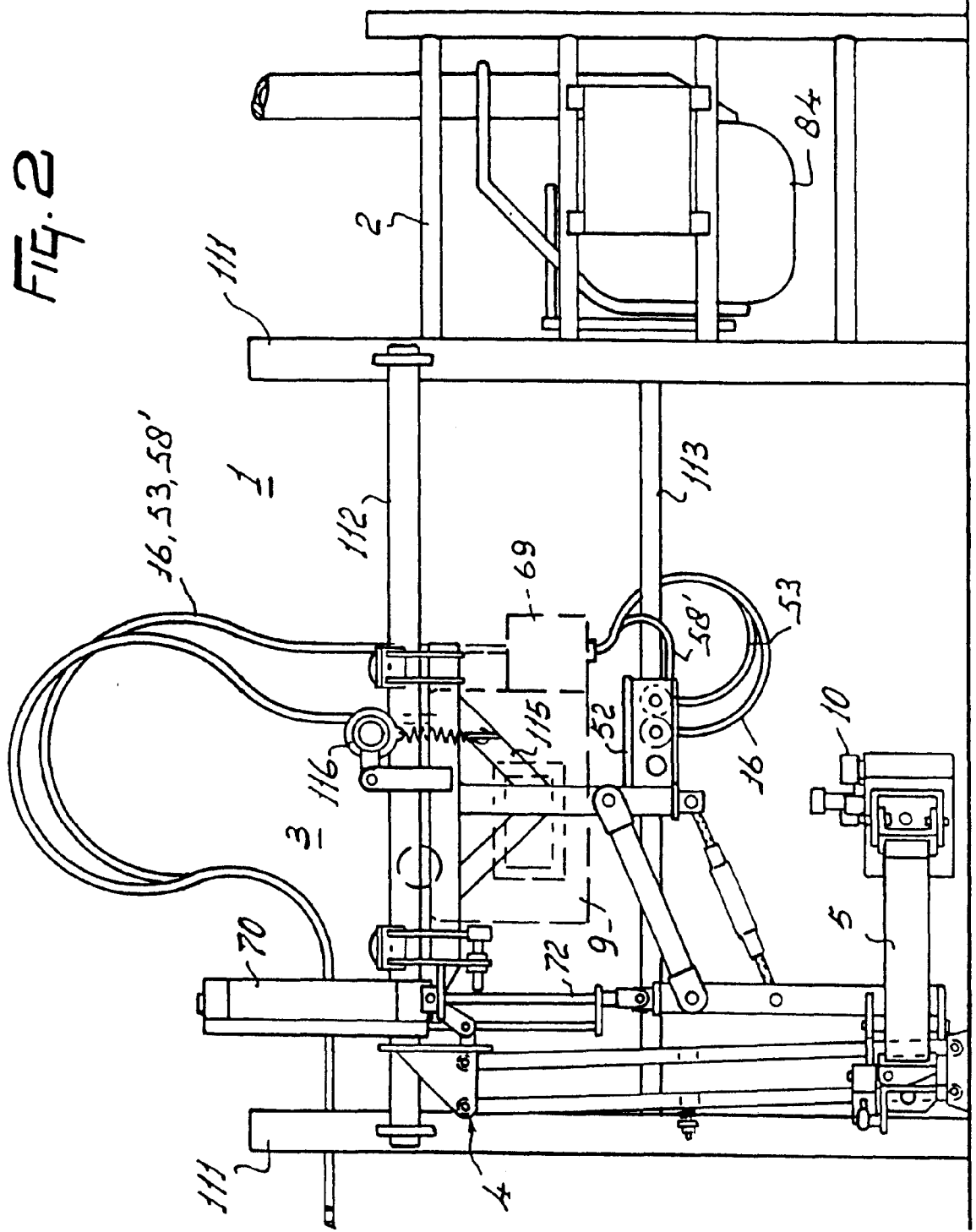
FIG. 2 is an elevational view taken in the direction of arrow II in FIG. 1.

FIGS. 1 and 2 show milking assembly 1 including a milking compartment defined by railing system 2, in which an animal to be milked is positioned during a milking run. Milking structure 1 includes milking robot 3, alternatively denoted milking plant 3, with which the animals are automatically milked. Milking robot 3 is shown in greater detail in the non-prepublished Netherlands Patent Application No. 9100992 and, insofar the present description does not mention otherwise, is operative in accordance with the description in the European Patent Application No. 0360354. Milking structure 1 further includes positioning device 4 for positioning milking robot 3 in the longitudinal direction of the milking compartment, as described in the Netherlands Patent Application No. 9000836. In addition, milking structure 1 includes, as is shown in the likewise non-prepublished Netherlands Patent Application No. 9101636 and again insofar the present description does not mention otherwise, sensors 6, 7 and 8 (FIG. 3) for determining respectively the vacuum in the teat cups 10, the electric conductivity of the milk supplied by the animal, and for determining whether a milk flow has started or stopped, in the respective teat cups 10. Teat cups 10 are located at the end of robot arm 5 of robot 3. Milking structure 1 comprises a line system, still further to be described, equipped with, inter alia, milk and vacuum lines, in which shut-off valves are incorporated. Both valves incorporated in the line system and robot 3 are controllable from computer 9. Insofar the word valve or cock will be used in the present description, a valve or cock controlled by computer 9 is meant in all cases.

The milking structure 1 is equipped with two computers 9 and 68, which operate independently of each other. The first one thereof is the process computer 9, denoted "computer 9" hereinafter, and is disposed on framework 115, which is movable in the longitudinal direction of the milking compartment, for robot arm 5. Process computer 9 controls all motional actions and decisions of and for robot 3 and a milk storage device still to be described and a rinsing device for robot 3 and the milk storage device. The motional actions include, inter alia, the energization of adjusting cylinders of motors for starting robot arm 5, teat cups 10, cleaning device 52, still to be described, and the valves and pumps in the line system also described subsequently in this description for movement of the milk produced, the vacuum and the rinsing fluid. The decisions which are automatically made by computer 9 on the basis of internally available data and data obtained via sensors, include, inter alia, the decision whether to continue or to stop milking of the animal after one or more teat cups 10 are uncoupled, and all remaining decisions described in the present description. The external data which are important for the milking operation are applied to computer 9 by appropriate means which are known per se. During operation computer 9 is in permanent contact with, or can at least be continuously interrupted by, the various sensors and valves associated with structure 1 and the read unit of an information carrier fastened to the collar of a milk animal. Said last information carrier provides computer 9 with data for the identification of the animal present in the milking compartment. Second computer 68 is in a fixed position and is mounted near feed trough 84, at that side of railing system 2 where milking robot 3 is located. Second computer 68 controls a feeding implement positioned at the head end of the milking compartment and records the relevant data as regards the milk yields of the milk animals, such as the quantity of milk produced, the conductivity of the milk and the milk temperature. To that end second computer 68 has a connection to milk level sensor 15 in milk collecting glass 12, to the conductivity and temperature sensor 7 and to a second read unit, not further shown, for identification of the milk animal present in the milking compartment. Milking collecting glass 12 is alternatively denoted milk de-aeration device or vent vessel. The first and second read unit are both attached to a rim, which during feeding is near the neck of a feeding milk animal, of feed trough 84 located in the milking compartment.

Figure 3:
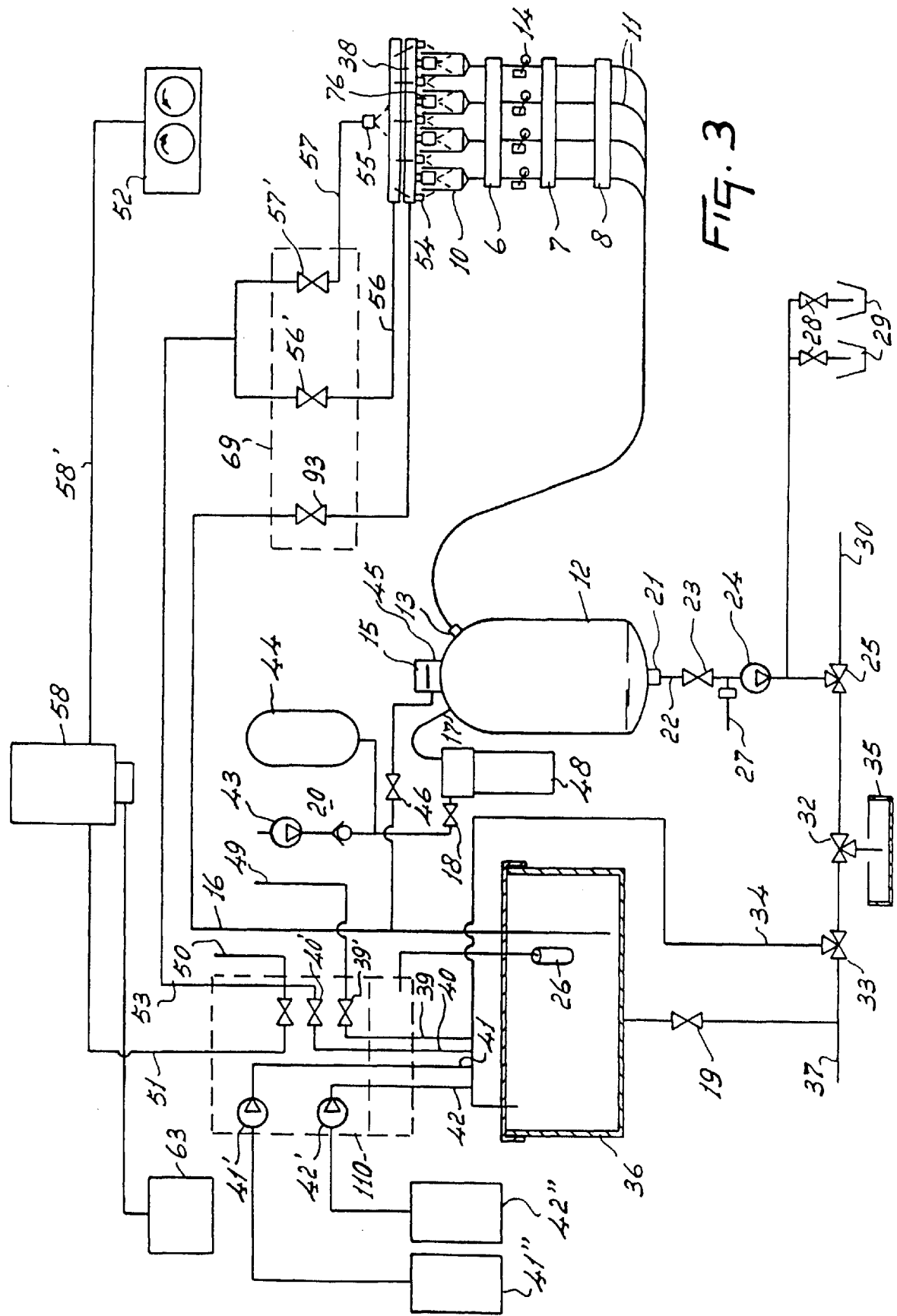
FIG. 3 is a schematic representation of the line system for milk and cleaning fluid, associated with the milking robot.

FIG. 3 schematically shows the line system for milking structure 1 and the associated means for discharging milk from teat cups 10 to cooled milk tank 60. Via milk line 11, each teat cup 10 is connected to collecting glass 12. Each milk line 11 incorporates, arranged one after the other, sensor 6 for determining the vacuum in teat cups 10, sensor 7 for determining the conductivity and the temperature of the milk and sensor 8 for the detection of a milk flow. Sensors 6, 7 and 8 are each accommodated in a block-like housing. Each of the three block-like housings contains four identical sensors; that is there are four identical sensors 6, four identical sensors 7, and four identical sensors 8, respectively, for each block-like housing. Each block-like housing is operatively connected to each milk line 11 so that each milk line 11 operatively incorporates one respective sensor 6, one respective sensor 7, and one respective sensor 8 of each block-like housing. In a typical embodiment, the block-like housings are interconnectable. Immediately behind vacuum sensor 6, which is included in each one of lines 11 in the region of the connected teat cup 10, shut-off valve or cock 14 controlled by computer 9 is incorporated in line 11.

Disposed on collecting glass 12 there are nozzles 13 to which milk lines 11 are connected. Nozzles 13 are located in the upper spherical portion of collecting glass 12, halfway between the upper central aperture and the cylindrical portion of collecting glass 12. At that side of collecting glass 12 that, relative to the upper central aperture, faces nozzles 13, collecting glass 12 has further nozzle 17 to which, via valve 18 which is energizable from computer 9, vacuum circuit 20, which forms part of milking structure 1, is connected. Collecting glass 12 is formed as a cylindrical central body with a spherical bottom and upper side. An aperture through which sensor 15 is inserted is provided in the upper side of collecting glass 12 in its midway point. The level of the milk in collecting glass 12 can be determined with the aid of sensor 15. Together with sensor 15 there is also provided in this aperture of collecting glass 12, for the purpose of cleaning the interior side of collecting glass 12, a spray member to which line 16 is connected. Nozzle 21 to which line 22 is connected is provided in the bottom of collecting glass 12 near its midway point. Line 22 accommodates computer-operated valve 23, to which fluid pump 24 is connected. Pump 24 is preferably a centrifugal pump, in which the drive shaft is arranged in a vertical position. The other end of fluid pump 24 is connected to computer-operated first three-way valve 25. A sensor in the form of electrodes 27 is arranged in line 22 between collecting glass 12 and pump 24, between valve 23 and pump 24. This sensor applies a signal to computer 9, from which it can be determined whether milk is locally present in line 22. In dependence on the signal supplied by electrodes 27, computer 9 provides a signal for putting centrifugal pump 24 in or out of operation.

Connected to the line portion between pump 24 and first three-way valve 25 there are lines, which incorporate computer-controllable valves 28, which end in sample bottles 29 for taking milk samples. First three-way valve 25 opens, in a first position, a connection to short feed member 30 of preferably not more than a few centimeters in length. Incorporated in line portion 30 is non-return valve (not shown), which prevents fluid from flowing back to three-way valve 25. Referring to FIG. 4, feed member 30 is in connection with circulating line 31, alternatively denoted recirculating line 31, which together with milk tank 60 constitutes milk storage construction 59, known also as a bulk milk tank. Referring again to FIG. 3, in a second position, three-way valve 25 opens a connection to second three-way valve 32. The latter opens, on the one hand, a connection to third three-way valve 33 and, on the other hand, to receptacle 35 for waste milk. Third three-way valve 33 has one end connected to line 34 which ends in reservoir 36, which is sealed against dust and dirt, for the preparation and storage of rinsing fluid and has its other end connected to drain pipe 37 leading to the sewer system (not shown). Ending in line 34 to reservoir 36 there are, taken in a direction from third three-way valve 33, arranged one after the other, hot-water supply line 39 which is fitted with computer-controllable valve 39', similar line 40 for cold water and two drain pipes 41 and 42 for an acid and a basic cleaning agent, respectively. These agents are supplied from reservoirs 41" and 42" respectively with the aid of computer-controlled displacement pumps 41' and 42' which are incorporated in lines 41 and 42 respectively. Because of the aforesaid placement of the lines 39–42 for cleaning agent and water, lines 41 and 42 for the cleaning agents can be kept short and the cleaning agent which might find its way into pipe line 34 is adequately rinsed off by the water from pipe lines 39 and 40.

The water supply lines 39 and 40 are each provided with computer-controllable valve 39' and valve 40', respectively, and are connected to supply pipe lines 49 and 50 for warm and cold water respectively, which generally are available outside the milking structure 1. In the present embodiment, the connection to cold water supply pipe 50 branches off within milking structure 1 into three pipe lines, namely said line 40 to reservoir 36, line 51 to cleaning implement 52 for cleaning the teats of the udder of the animal to be milked and to line 53. Line 53 leads to spray heads 54 for cleaning the outside of teat cups 10 and to spray head 55 for cleaning the upper side of cleaning cassette 38 used for cleaning implement 52. Cleaning implement 52 and cassette 38 with spray heads for the interior side of teat cups 10 are identical to the embodiment described in the non-prepublished Netherlands Application No. NL-A 9101676. Line 53 splits into line portions 56 and 57 for the benefit of the above-mentioned spray heads 54 and 55 respectively near the starting position of the end of robot arm 5. Both branches 56 and 57 are fitted with a valve 56' and a valve 57', respectively. Line to spray heads 54 for spraying the outside of teat cups 10 branches off in cleaning cassette 38 to several spray heads 54. Spray heads 54 project vertically between the ducts for spray heads 76 for spraying the interior side of teat cups 10, with the object of spraying the outside of teat cups 10. Branch 57 ends in spray head 55 which is directed to the upper side of cassette 38, on which, during operation, dirt from implement 52 for cleaning the udders may collect. Namely, cleaning implement 52 is mounted on top of cassette 38 which is retained on top of teat cups 10 by means of vacuum, and is moved by robot arm 5 to the udder of the animal to be milked. Valves 93, 56' and 57' are, together, housed in protective cabinet 69, in which the relevant lines are fixed in position directly before and after their interruption by a relevant valve unit.

Water pressure-driven pump and mixing implement 58 is incorporated in the line to cleaning implement 52. Implement 58 pumps chlorine from vessel 63 and mixes it with the water from water supply line 51, so that the portion of line 58' from pump 58 conveys a chlorine water mixture for rinsing and disinfecting cleaning implement 52.

Incorporated in rinsing water reservoir 36, there are pipe line 16 for conveying rinsing fluid, level sensor 26 and line 34 for the feed-back of rinsing fluid from milk glass 12. Line 16 branches off to form, on the one hand, a first branch leading to cleaning cassette 38 for teat cups 10 and, on the other end, a second branch leading to the upper side of collecting glass 12. The branch to cleaning cassette 38 leads via the space over milking robot 3 to the location in which teat cups 10 are present in the quiescent state of robot arm 5. The last portion of the line is flexible and is provided with an ample loop to allow tracking of the motions of milking robot 3. Near teat cups 10, line 16 accommodates computer-controlled valve 93. In cleaning cassette 38, the rinsing fluid is conveyed via a duct system to four spray heads 76 which each uniformly distribute the rinsing fluid along the interior walls of teat cups 10. The driving force for the rinsing fluid is here the vacuum which is to be applied additionally for the benefit of the milking operation via milk lines 11 and collecting glass 12 in vacuum reservoir 44 with the aid of pump 43. In addition to pump 43 and vacuum reservoir 44, vacuum circuit 20 also included an implement for separating fluid 48, which is necessary to prevent the fluid from penetrating into pump 43. Fluid separator 48 is provided in the vacuum line between pump 43 and vacuum reservoir 44 on the one hand, and the line portion to collecting glass 12, in which valve 18 is incorporated, on the other hand. A plurality of milking robots 3 can be connected to vacuum circuit 20. Each of these further milking robots 3 are connected via line 16 to one and the same rinsing reservoir 36.

The wall of collecting glass 12 is cleaned via spray member 45 which is contained in the central upper aperture and to which the second branch of line 16 is connected. From spray member 45 rinsing fluid is sprayed in a lateral and slightly upward direction from a spray ring which partly projects into collecting glass 12. This construction has for its effect that the rinsing fluid is distributed as a film along the entire interior wall surface of milk glass 12. That portion of line 16 that is branched off to collecting glass 12 is further provided with computer-controlled valve 46. The supply of rinsing fluid to spray member 45 is provided, as also holds for the spray heads 76, by the vacuum prevailing in milk glass 12. The rinsing fluid collected in milk glass 12 is conveyed, depending on the type of rinsing and/or the phase of the rinsing operation, with the aid of computer signals via the aforementioned three-way valves 25, 32 or 33 to either rinsing fluid reservoir 36, or to line 37 for discharge to the sewer.

Also in accordance with the invention, referring again to FIGS. 1 and 2, milking structure 1 is of such a construction that railing system 2 can be detached from a rack formed by two posts 111, against which partition 114 is applied. Posts 111 are interconnected by two horizontally extending beams 112 and 113; upper beam 112 has connected thereto a further beam 112' having a round profile and serving as a straight guide for frame 115 for the suspension of robot arm 5. In this situation, the motion of frame 115 is effected by a wheel which is pushed by spring action against straight guide 112 and is driven by motor 116 which is controlled by computer 9. Attached to partition 114 there are the components belonging to the milking apparatus assembly 1, such as collecting glass 12, fluid separator 48, milk pump 24, sample-taking valves 28 and bottles 29, lines 22, 34, 39, 40, 41, 42, 51, 53, 56 and 57, rinsing fluid reservoir 36, protective cabinet 110, holders for vessels 41" and 42" and chlorine vessel 63, chlorine pump 58 and second computer 68. Attached to mobile frame 115 there are robot arm 5, adjusting piston and cylinder 70, motor 116, computer 9 and protective cabinet 69. To ensure that frame 115 and robot arm 5 can freely move, portions before and behind protective cabinet 69 of lines 16, 53 and 58' are flexible and applied with a loop. The above-described construction allows that a large portion of the milking structure 1, among which is milking robot 3, can be mounted and tested in the factory. Testing only requires connections for electricity, cold and warm water, and discharge pipes for test fluid which may originate from valves 25, 32, 33, or 19 and a plug for the electronic connection of computer 9 to the control of access gates 2' and 2" which give access to the milking compartment, and to the rear unit. The construction renders a compact transportation packing of the tested milking construction possible.

FIG. 4 shows aforementioned milk storage construction 59. circulating line 31 incorporates, located near the bottom side of the milk tank 60, a pump 61 which at regular intervals, or continuously, as the case may be, flushes at a low speed line 31 which is insulated from heat absorption. Immediately behind pump 61, a non-return valve 62 is accommodated in line 31. Substantially immediately after this non-return valve 62, a valve 66, for the supply of air, is also accommodated in line 31. Circulating line 31 is, via line 125 at one end, in an open connection with the bottom side of milk tank 60 and, seen in a direction from the end of the milk tap of tank 60, comprises a first predominantly horizontally extending line portion, in which there are arranged, one after the other, the pump 61, the non-return valve 62 and the air supply valve 66. Thereafter line 31 merges into a predominantly vertically extending portion which, to allow an overhead crossing, merges into a horizontal portion which extends towards milking robot 3. Near robot 3, pipe line 31 extends predominantly vertically to a level which is located relatively low above the ground, and thereafter curves back to return along substantially the entre route just described to the upper side of milk tank 60. In the said curve near robot 3, a T-member is incorporated, to which supply 30 is connected. If so desired plurality of robots 3 can, of course, be connected to this point for discharging their milk to one and the same storage tank 60. The said low-lying portion of recirculating line 31 is, in this situation, passed through the area below collecting glass 12, so that for the connection of glass 12 to recirculating line 31 the shortest possible distance can be preserved. In the present embodiment of the milking structure 1 this implies that collecting glass 12, valve 23, pump 24 with sensor 27 provided near the inlet thereof and three-way valve 25 are immediately, if not substantially immediately, contiguous to each other.

Above tank 60 the return portion of milk line 31 merges into a flexible portion which is connected to feed-through pipe 65 arranged in lid 64 of tank 60. Three-way valve 118 is connected to that end of feed-through pipe 65 that is incorporated in tank 60. In a first position valve 118 opens a connection to a remaining portion of milk recirculating line 31, a bevelled end of which ends just above the bottom of tank 60, at a distance from the supply end of line 31. In accordance with the invention, the fact that the milk is discharged at a slight height above the bottom of tank 60 ensures that the absorption of air in the milk is limited. Consequently this construction counteracts decomposition of fat molecules and consequently prevents the milk from turning sour and rancid. In the remaining portion of line 31, that is to say in tank 60, there is further incorporated a construction which is known per se for accommodating a so-called thimble filter 67. To enable removal of thimble filter 67, the remaining portion of line 31 is assembled from two portions which are screwed together.

In a second position, three-way valve 118 opens a connection with line portion 119 which is used exclusively for rinsing the tank 60. The end of line portion 119 is provided with spray head 121 which is induced by the pressure of the rinsing fluid flow to make such a circular motion that at least substantially the entire interior wall of milk tank 60 can be cleaned. Arranged between three-way valve 118 and spray head 121 there is valve 120 which is also controllable by computer 9. via valve 120 the rinsing fluid can, if so desired, flow freely and consequently faster than through the spray head 121, into tank 60. The branch containing computer-controlled valve 117 provides a free-flow of the cleaning fluid into tank 60. Branched-off discharge line 125 is arranged between pump 61 and the supply inlet of line 31. Incorporated in discharge line 125 there is computer-controllable valve 126 which leads to discharge outlet 127, to which a coupling member of a discharge line can be connected. A grid, not shown, which covers an outlet to the sewer is located below discharge outlet 127.

Tank 60 further accommodates level sensor 123 which is connected to computer 9. Tank 60 is also provided with motor-drivable stirrer 124 for keeping the milk in motion. cooling members, not shown in the drawing, of a cooling device which is controllable by computer 9 are arranged along the bottom of tank 60. The intensity of the cooling by the cooling device is made to depend, in accordance with the invention, via computer 9, on the signal produced by level sensor 123. The cooling intensity is kept low, more particularly, when there is only a very small quantity of fluid in tank 60. This prevents freezing of milk drops caused by the stirrer when the milk level is low, on that portion of the bottom wall and/or along the edge of the milk surface that still extends above the milk level.

FIG. 5 shows the layout of a safety device in adjusting piston and cylinder 70, which in the present case is a pneumatic piston and cylinder unit, by means of which robot arm 5 can be moved up and down by means of compressed air. The wall of adjusting piston and cylinder 70 accommodates near two ends, that is to say in actual practice on either side of the piston or plunger 71 of cylinder rod 72, measuring pipeline 73 and 74 respectively which lead to sensor 75 for recording the difference in pressure between the cylinder compartments located on both sides of plunger 71. If the difference in pressure between the compartments above and below plunger 71 exceeds a preset value, which at least corresponds to the weight of the robot arm 5, sensor 75 conveys a signal indicating an overload to computer 9. To produce the signal, use can be made of either a slide resistor or a contact switch, as shown in FIG. 5. As long as the signal continues, computer 9 continues to supply a signal in response to which valve 77 is opened. As a result thereof the space under plunger 71 is in connection with the atmosphere, so that plunger 71 easily and rapidly moves downwardly. Thus, robot arm 5 yields, when pressure is exerted thereon by, for example, a leg of an animal, so that the risk of deformation or different types of damage to robot arm 5 is significantly reduced. Non-return valve 104 in the connecting line between the compartments below and above piston 71 ensures that robot arm 5 is not pushed further down when its bottom side hits an obstacle, such as the floor or a foot of a farmer. In addition, required supply liens 79 and 80 for compressed air are provided on both compartments. The supply of air is determined by computer 9 by means of valves 81 and 82 incorporated in these lines respectively. For the supply of compressed air both lines are connected to compressed air pump 83.

FIGS. 6 and 7 illustrate a construction for milk filter 85 which automatically renews itself, with which a milking apparatus in accordance with the invention may be provided. Milk filter 85 is in the form of a sheet or film which is wound about two bobbins 86 and 87. Bobbins 86 and 87 are supported by a plate-like carrier 88 attached to tubular milk line 89 which is passed between bobbins 86 and 87. In the region of bobbins 86 and 87, the milk line is severed and provided with two flanges 91 and 92 which are provided on the respective ends created by the cut. Flanges 91 and 92 are coated on their facing planes with an elastic synthetic resin material, so that filter film 85 can be confined in a leak-tight manner between the flanges 91 and 92. The flanges are placed obliquely, in the present embodiment at an angle of approximately 45° to supplying line portion 89, whereby a relatively large filter surface area is obtained. Flange 91 at supplying milk line portion 89 has an upwardly directed hollow profile which guides film 85, whereas flange 92 at milk discharging line portion 90 has a spherical profile of a matching shape, so that when the flanges are pressed together a proper fit and sealing of the flange portions is guaranteed. Both line portions 89 and 90 are pivotal relative to each other by pivotal point 94 located outside the plane of intersection of the flanges 91 and 92. For this purpose carrier 88 extends partly to over flanges 91 and 92 and discharging line portion 90. Attached to discharging line portion 90 there is holder 95 which extends vertically and upwardly and, at said pivotal point 94, is connected to the carrier 88. Pivotal point 94 is located on a line which extends perpendicularly to the plane of intersection between flanges 91 and 92 at approximately one-fifth of the distance between this plane and that end of carrier 88 that is located on the same line and above discharging line portion 90. Between the end of carrier 88, above discharging line portion 90 and connection point 96 (located near discharging line portion 90), there is pivotally provided adjusting piston and cylinder 97 which is energized by computer 9. In the region of connection point 96, discharging line portion 90 merges into flexible line portion 98. In the immediate vicinity of the place of cut, supplying line portion 89 is further provided with computer-controllable valve 100. Taken in the direction of flow, that is to say in the direction from valve 100 to filter 85, there is provided, in recirculating line 31 behind filter device 85, a non-return valve, which is not shown in the Figure. In addition, both the supplying and the discharging milk line portions 89 and 90 respectively are provided in the vicinity of the point of cut with pressure sensors 101 and 102. Lower bobbin 86 is placed interchangeably in receptacle 103, which is filled with disinfectant and also serves as a drip can for milk drops which may form during detaching of flanges 91 and 92 from each other. Arm 107 is mounted on shaft 105 of bobbin 86 by means of ratchet mechanism 106. Arm 107 has its end connected to point of connection 96 for adjusting piston and cylinder 97 on discharging line portion 90 via a pivotally arranged intermediate rod 108. The connection of intermediate rod 108 and arm 107 for bobbin 86 has slotted hole 109 which is arranged so that on energizing the adjusting cylinder 97, the flange portions 91 and 92 are first removed from each other, before arm 107 is moved. During the closing motion of adjusting cylinder 97, arm 107 is moved in the return direction via intermediate rod 108. During the reverse motion of intermediate rod 108, ratchet mechanism 106 prevents rotation of shaft 105 of bobbin 86, so that the new piece of filter material is kept in its place.

According to the invention, such a device for the automatic renewal of filter 85 can be accommodated in recirculating line 31, and preferably in the part between supply line 30 and the milk-discharging end of recirculating line 31. Furthermore, because of the small thickness of filter 85 and required flanges 91 and 92, the device is eminently suited for accommodation in milk supply line 30 which must be kept as short as possible. In this case the mechanical portion of the device, which together with carrier 88, piston and cylinder 97 and bobbins 86 and 87, is connected to a component part of the milking apparatus, which part is in a fixed position at some distance from line 89. In a further embodiment of the invention, the device for the automatic renewal of filter 85 is incorporated in each milk line 11 which is connected to one of teat cups 10 to be connected to a milk animal. This has the advantage that filter 85 surface area can be increased and more specifically that any impurities can be detected for each quarter of the udder of a milk animal. The locations outside recirculating line 31 have the advantage that the milk obtained need pass only once through a possibly contaminated filter. Moreover, in accordance with the invention, contact of the milk with a contaminated filter can be significantly reduced by renewing the filter each time after a milk animal has been milked.

FIG. 8 shows detection device 128 for the computer-controlled detection whether a discharge tube for removing milk from storage device 59 has been coupled or not coupled thereto. The device comprises tubular portion 129 on which, via a projection, in the present case flange 131, contact switch 130 is attached in such a manner that it is operable in only one direction parallel to tube 129. When switch 130 is depressed, this is the signal for computer 9 that a discharge tube 139 has been coupled to discharge outlet 127, which is considered to be the signal indicating that the milk can safely be discharged, or that valve 126 can be opened, as the case may be. For safety's sake valve 126 is not opened until switch 130 has been kept in the depressed state for at least a presettable period of time, by default, for five seconds. Coupling member 132 of the discharge line can, as for example in the present embodiment, be a screwed connection, but may alternatively be a so-called bayonet fit or a gripping clamp coupling. Tube 129 or carrier of device 128 can be bolted around discharge outlet 127 by means of one or more bolts 133 which are inserted along a circle in tube 129 and which bear against discharge outlet 127 and thus clamp detection device 128 onto discharge outlet 127. Connecting bolts 133 constitute at the same time a setting feature by means of which switch 130 does not make contact, i.e. applies a signal to computer 9, until coupling member 132 is substantially completely in the coupled state. For such a setting bolts 133 are temporarily loosened for positioning device 128 at a larger or less large distance from discharge outlet 127. In the case in which coupling 132 is in the form of a gripping clamp coupling, switch 130 may alternatively, in accordance with the invention, be positioned in the path through which the lever of this type of coupling pivots. According to the invention, a further protection of switching device 128 can be obtained by means of a guard, not shown in the drawings, which intersect at least the imaginary extension of discharge outlet 127 and which preferably also forms a shield at the upper side and at the side edges. Preferably, this guard is pivotal about a pivotal shaft provided between valve 126 and switching device 128, at the upper side of the discharge tube and transversely thereto. The section through the extension of discharge outlet 127 by said guard renders it necessary to pivot the guard to allow a desired connection of a discharge tube. According to the invention, this pivotal motion is utilized by having the guard, in a stable position in which the guard has been pivoted out of the extension of discharge outlet 127, bear against a switch which, via a so-called interrupt, causes computer 9 to start a continuous check on the state of switch 130. Closing the guard terminates in the same manner this continuous check, but does not mean that checking the position of switch 130 has been rendered impossible. Checking of switch 130 by computer 9 is possible at any moment, as soon as this is deemed desirable as part of a procedure. Such a provision reduces the occupation of computer 9 during the relatively long intervening moments in which discharge outlet 127 cannot be used.

Such a guard may also be used as an additional safety measure when switch 130 or a similar contact element has not been provided on the discharge tube, but is, for example, in the form of a button provided in the environment. In that case it is up to the person who discharges the milk to ascertain whether the discharge line has been properly connected and also to remember to depress button 130. Should the guard not have been swung clear here has for its result that pushing the button does not have any effect.

FIG. 8 further shows an embodiment in which detection device 128, arranged between switch 130 and a coupling member 132 to be connected, includes a ring 133' which is provided with a fit around the tube portion 129 by means of a plain bearing 134. Ring 133' is prevented from sliding by means of one or a more hooks attached to the flange 131 which in the present embodiment is constituted by ring 135 with few turned-in bolts 36. Ring 133' is kept clear from flange 131 and consequently from switch 130 by means of compression spring 137 arranged between flange 131 and ring 133' and around tube 129. Such a construction prevents that switch 130 is depressed by coupling member 132 which is out of alignment and/or that pin 138 of switch 130 gets jammed in the bore of flange 131. Ring 135 protects the embodiment shown from dirt. It should further be noted that ring 133', or switch pin 138, when the first-described simple construction is used, can project, depending on the shape of discharge outlet 127 or coupling member 132, for a larger or lesser extent, beyond tube 129, either in the direction parallel to the tube, or transversely thereto.

FIG. 9 shows an embodiment of the milk storage implement, valve 118' and a filter 142 in lieu of filter 67 disposed outside milk tank 60. In this situation that extreme end portion of recirculating line 31 that discharges the milk, extends through the wall of tank 60. To that end, the aperture in the present embodiment is provided in line 125, which has a larger diameter than recirculating line 31. In the midway point of line portion 125, the milk-discharging line portion 31 is bent in such a manner that the bent portion extends parallel to discharge line 125 and bottom of tank 60. Line portion 125 which is contiguous to an aperture in tank 60 and includes valve 126 and discharge outlet 127, has a larger diameter than the further portion of recirculating line 31 so as to enable accelerated emptying of tank 60. The milk-discharging extreme end portion of recirculating line 31 continues inside tank 60 till near that wall portion of the tank that faces the supply inlet for supply line 125. In the present embodiment valve 141, which can be operated manually as well as by computer 9, is incorporated in the discharging line portion of recirculating line 31, both before and after the filter 142. This renders it possible to replace filter 142 without any milk getting lost from tank 60 via opened filter 142 in accordance with the communicating vessel principle, or that milk present in the upper part of recirculating line 31 flows away. Near filter 142 there is switch 152, by means of which a signal can be applied to computer 9 to indicate a desired replacement of filter 142. Operating this switch has for its result that computer 9 stops pumping milk from collecting glass 12 to tank 60 of all milking plants 3 connected to recirculating line 31, or postpones this pumping operation, as the case may be. Also, the permission for a milk animal still to be milked to enter is postponed until switch 152 has been switched off. Operating switch 152 also has for its effect that pump 61 is stopped. The embodiment shown in FIG. 9 comprises two spray heads 143, which increases the possible feed-through of spray fluid to such an extent that cleaning of the tank wall can be effected on the supply of cleaning fluid to the storage implement 60. A valve 117 for a free flow into the tank, as in FIG. 4, is then superfluous.

FIG. 10 shows a device for a milk filter, for which temporarily stoppage of the milking apparatus is not necessary. To that end the storage construction 59 includes two filters 147 and 148 which are incorporated in a local branching point of recirculating line 31. At that side of filters 147 and 148 to which the milk is supplied, branching of line 31 is realized with the aid of a valve 146 which in a first neutral position causes the milk to flow along both filters 147 and 148 and in a second and a third position causes the milk to flow along the one or the other filter, respectively. At that side of filter 147 and 148, from which the milk is discharged, both branches of recirculating line 31 are provided with a non-return valve 149 which prevents milk from refluxing via filter 147 or filter 148 opposite to it. To enable replacement of filter 147 or filter 148, filters 147 and 148 are each connected to valve 146 via flexible line portion 151. In normal operation valve 146 is in the neutral position so that in neither of the two filters 147 and 148, milk is stagnant for a long period of time. For the purpose of replacing filter 147 or filter 148, valve 146 is adjusted to the second or the third position as a result of which recirculating line 31 can temporarily continue to function via opposite filter 146 or 148. The position shown in FIG. 10 causes the milk to flow from valve 146 via the filter 148 (shown on the right). The filter structure shown in FIG. 10 is preferably placed in the position of filter 142 shown in FIG. 9. The valves 141 are then superfluous.

The mode of operation of the apparatus, in supplementation of the patents already mentioned in the foregoing description, is as follows. After the robot 3 has detected in a manner known per se the location of a teat and has placed relevant teat cup 10 under this teat, shut-off device 14 of milk line 11 of relevant teat cup 10 is energized by a signal from computer 9 causing it to open so that a vacuum is produced in teat cup 10 and the latter can be connected. In a similar manner the other three teat cups 10 are connected one after the other to the teats.

It may happen during milking of a milk animal that teat cup 10 becomes detached from a teat of the milk animal, for example because it hooks a leg behind milk line 11 and kicks the respective teat cup 10 from its teat. In accordance with the present invention, computer 9 is immediately signalled, with the aid of sensor 6, the resultant drop in pressure in the vacuum. In response thereto, computer 9 energizes, in the first instance, relevant shut-off device 14 and in the second instance a mechanism for withdrawing a connecting element present between relevant teat cup 10 and the end of robot arm 5. As a result of the immediate withdrawal of the connecting element which in the present embodiment is flexible, detached teat cup 10 is pulled up against the end of robot arm 5 before teat cup 10 has landed on the floor. In this manner contamination of teat cup 10 is prevented. Teat cup 10 may therefore, after it has been withdrawn to its initial position on robot arm 5 be reconnected without the need for cleaning. The criterion for the reconnection is that adjacent teat cup 10, in the case of front pair, and a rear pair of teat cups 10 are still in their connected state at the desired reconnection moment.

In a further embodiment in accordance with the invention, teat cup 10 lands on the floor after it has become uncoupled by kicking. In that case, independently of the setting of computer 9 by the farmer, an action of the farmer is awaited, or it is automatically decided on the basis of one or more preset criteria, to reconnect teat cup 10 or to refrain from further milking of the entire udder or the remaining quarters, as the case may be. The criterion on the basis of which computer 9 decides to continue milking, can be set by the farmer and is based on the period of time elapsed since last teat cup 10 was connected, or, to the farmer's option, since the connection of first teat cup 10. Alternatively, said criterion is based on the remaining time available for milking the animal. The time still available to finish milking of a relevant animal is determined from the anticipated time required to finish the relevant animal. The anticipated time required for milking is for the first milking run an estimated default value of ample duration or, otherwise, a time set by the farmer. The first anticipated time is thereafter adapted each time after a milking run to the recent historically required milking times recorded by computer 9. The remaining time still available at the moment at which teat cup 10 becomes uncoupled is determined by reducing the available time by the milking time already elapsed. Otherwise, for the case in which the total anticipated time for milking the cattle stock exceeds the actually available time for milking robot 3, the available time is automatically corrected by a factor which represents the ratio of the total anticipated milking time for all the animals to be milked to the actual time available for milking robot 3.

If the total anticipated milking time is less than the time actually available to milking robot 3 in each milking round of a cattle stock, exceeding the anticipated milking time is always possible until the free time available for the relevant milking round to milking robot 3 has been used up. For the animals which are milked in the present alternative after the spare time available to robot 3 has been used up, there is thereafter no more time available than the anticipated milking time per milk animal. The alternatives described are based on three milking rounds per 24 hours' period for a stock of 40 to 50 cows. The anticipated required milking time is updated for each quarter by computer 9. The time required to milk a given quarter is automatically derived by computer 9 from the start and end times at which milk flow sensors 8 detect a milk flow.

In addition, also in accordance with the invention, the milking structure 1 is activated so that the sequence in which teat cups 10 are connected to the teats of an udder corresponds to the mutual sequence in a decreasing order of the anticipated milking time of the quarters of the relevant udder. In a further embodiment in accordance with the present invention, the rear and thereafter the front pair of teats, rear and front being taken in the direction in which robot arm 5 approaches the udder, are first connected. Of each pair of teats the quarter with the longest anticipated milking time of each pair of teats is connected first. This embodiment also includes a different method in accordance with the invention, in which, in the case teat cup 10 is kicked from the teat, reconnection is only effected if teat cup 10 for the adjacent teat is still in the coupled state.

If on the basis of one of the above-described criteria it is automatically determined to reconnect an inadvertently uncoupled teat cup 10 and if, indicated by the data in computer 9, cleaning of teat cup 10 is desirable, the entire milking cluster is then detached and subjected to a so-called intermediate rinsing operation which will be described hereinafter. Preceding the intermediate rinsing operation, collecting glass 12 is emptied. The decision automatically to reconnect the milking cluster is therefore only taken if the expected quantity of milk remaining in the quarter, which according to expectations still has the highest quantity of milk, is not less than a percentage to be preset by the farmer, by default 10%, of the anticipated yield of the same quarter still holding the greatest quantity of milk. Thereafter a second condition must be satisfied before automatic reconnection is effected. This condition consists in that, after the time required for cleaning and reconnection of the milking cluster has been deducted, sufficient time is still available to collect a reasonable quantity of milk. The remaining available time which is considered to be sufficient, can be preset by the farmer and amounts by default to one minute. Cleaning teat cup 10 which was inadvertently uncoupled is not necessary if the milk of the milked animal will be discharged to waste milk dump 35. This is, for example, the case when the cow yields colostral milk, is treated with penicillin or is troubled with mastitis. In that case reconnection of uncoupled teat cup 10 will be effected, if possible, without a preceding removal of the entire milking cluster.

If on the basis of the above rules the cow is not milked further, a procedure for removing the milk animal from the milking compartment and to allow another animal to enter is initiated. The remaining milking time not spent on the removed animal, computer 9 adds to the actual time still available to milking robot 3 in a milking round. The above-described methods for reconnection of teat cup 10 may have been combined, according to the invention, with an organizational milking method in which each animal is free to choose, within predetermined time limits, the moment of her milking turn. In this situation it applies that an animal cannot be milked until a period of time which must be preset in computer 9, by default six hours, has elapsed after a previous milking turn. If a milk animal stays away from milking robot 9 for a period of time exceeding an also presettable period of time, by default seven hours, then the animal is entered, as long as it has not reported in milking compartment, in a list for attention of the farmer. In this situation it is up to the farmer to ensure that the animal arrives in the milking compartment at some moment. The said time limits can be updated per animal in computer 9. The time limits for an animal leaving a lactation period, are automatically updated to eight or nine hours, respectively.

Said so-called intermediate rinsing operation consists of rinsing the milking structure 1 with tepid water, which rinsing operation is performed via pipe lines 56 and 16 at both the exterior side and the interior side of teat cups 10. To distribute the rinsing water, valve 93 is continuously kept open during the rinsing operation, while valve 46 is opened at regular intervals, for example one second open and three seconds closed. During the intermediate rinsing operation the valve 56' is also opened for a given time. Preceding the rinsing operation of collecting glass 12, the valve 40' is, however, opened first to fill the reservoir 36 with tepid water up to the first of the three levels to which the level sensor 26 can be adjusted. So as to convey the rinsing water through the pipe lines, shut-off devices 14 and vacuum valve 18 are opened simultaneously with closure of valve 40'. Such a so-called intermediate rinse is performed each time after the milk of a milked animal has been discharged to waste milk dump 35 and each time after a presettable period in which no milking animal has appeared at milking robot 3, by default a period of half an hour, has elapsed. Such a so-called intermediate rinse is further more effected in the embodiment in which teat cup 10 lands on the floor after uncoupling, each time it has become uncoupled.

After a longer period of time, which can be preset in computer 9, by default every eight hours, has elapsed, a cleaning and disinfecting rinse is automatically performed. For this purpose computer 9 activates the displacement pump 42' for admixture of basic cleaning and disinfecting agent. The temperature of the rinsing solution is high (70° to 80° C.). The cleaning operation is preceded by a rinse with tepid water which is thereafter discharged to the sewer. After preparation of the cleaning fluid, the valves 25, 32 and 33 are adjusted such that the cleaning fluid passed through teat cups 10 and collecting glass 12 is circulated via rinsing water reservoir 36 during a presettable period of time, by default five minutes, whereafter the rinsing fluid is discharge to sewer line 37 via valve 19. Hereafter reservoir 36 is filled with cold water for a rinse to cool milking apparatus and to remove residual disinfecting agent. This rinsing agent is discharged to the sewer. The same procedure is performed at longer intervals, in the present case every fortnight, with an aggressive acid cleaning agent which removed deposit in the form of salts. Hot water is used in this procedure. During the rinsing operation the valve 46 is kept open and closed at intervals in the manner already described above.

The milk storage device 59 is rinsed each time after it has been emptied, for example by a milk collection service, which for that purpose connects discharge line 139 to discharge outlet 127 of tank 60. Connecting milk discharge line 139 to discharge outlet 127, has, in accordance with the invention, for its result that process computer 9 signalizes that discharge line 139 has been connected. In response thereto process computer 9 adjusts itself in such a manner that, after the milking run then in progress, a subsequent milk animal is not permitted to enter one or more milking robots 3 or milking plants 3, as the case may be, connected to storage implement 59, and/or robot 3 is temporarily put out of operation. Computer 9 also responds to this signal by stopping pump 61 and controlling valve 126 in discharge line 125 of tank 60 to an open state, although with some built-in delay, in response to the signal that discharge line 139 has been connected. In this situation computer 9 also drives a mechanism, not further shown in the drawings, which locks a handle for manual operation of valve 126. This drive eliminates the lock, which permits valve 126 to close manually, more specifically in the event of a calamity. When valve 126 is in its open state, emptying of tank 60 can be started, which is usually effected with the aid of a pump arranged outside milk storage device 59. Process computer 9 ensures that valve 126 is returned to its closed state as soon as it has been detected via level sensor 123 that tank 60 is empty, or as soon as it has been detected that tank 60 is empty, or as soon as it has been detected that tank 60 is not empty, but that discharge line 139 is not or at least not adequately connected. As part of this operation of monitoring emptying of tank 60, computer 9 detects, on the basis of a memory value which represents the status of milking robot 3, whether all the milking robots 3 connected to milk storage device 59 have terminated the milking run in progress at the moment at which discharge line 139 is connected. That is to say that via sensor 27 it is ascertained that milking glass 12 of relevant robot 3 is empty. This is usually already the case quite some time before emptying of tank 60. Process computer 9 then initiates, simultaneously with initiating the operation in which emptying of tank 60 is monitored and the sequential completion of the milking runs, an intermediate rinse for each of robots 3. Since each of robots 3 is connected to rinsing line 16 on one and the same rinsing water reservoir 36, they are rinsed one after the other. If after each of robots 3 has been rinsed tank 60 is not yet empty, those robots 3, of which the last disinfecting rinse was furthest back in time are subjected to a disinfecting rinse, while omitting the prerinse. This is thereafter repeated after each disinfecting rinse. If it has been found by means of level sensor 123 that tank 60 is indeed empty, valve 126 is closed and a customary disinfecting rinse is applied to tank 60. For that purpose the fluid collected in reservoir 36 is pumped in a manner already described to storage tank 59 via the pipe line system and pump 24 of one of robots 3. The fluid then flows into tank 60 via valves 25, 118 and 117. After process computer 9 has detected, for example via sensor 27, that all the fluid has been pumped off, valve 117 is closed and circulation pump 61 is made operative for a certain period of time. In this situation the position of valve 118 is adjusted such that the fluid is passed through spray head 121. The pressure of the fluid causes spray head 121 to roll in such a manner that the major portion of the tank wall is cleaned. Subsequent to this operation, computer 9 checks whether discharge line 139 has already been decoupled, valve 126 in discharge line 125 is kept in its open position until it has been detected via level sensor 123 that tank 60 is empty. If discharge line 139 has not yet been disconnected from discharge outlet 127, valve 126 is kept in its closed position and a very shrill sound signal is produced. The fact that valve 126 stays in its closed position means in this phase of the procedure that the cleaning procedure is postponed. As soon as any coupling member 132 is removed from discharge outlet 127, valve 126 in discharge line 125 is kept open until via level sensor 123 it has been detected that the tank 60 is empty. The above-described rinsing procedure applies to both the main and the pre- and final rinse. In addition, storage tank 59, and also the milk line system of robot 3, are always given after a predetermined time, which can be preset in computer 9, an acid rinse for removing deposit. Such an acid rinse of tank 60 then follows after a disinfecting rinse. As soon as all the rinses of tank 60 desired at a given moment are performed in accordance with the computer program which is based on the above rules, the said postponements are cancelled, so that, inter alia, milk animals are again admitted, and the milking procedure or method already described is continued.

The above-described device for automatically renewing or displacing milk filter 85 operates as follows.

Before computer 9 supplies a signal for energizing adjusting cylinder 97, a signal for closing valve 100 in supply line portion 89 is first supplied and removing flanges 91 and 92 from each other is not effected until the time required for closing valve 100 has elapsed. During activation of adjusting cylinder 97 flanges 91 and 92 have both their upper and their lower edge completely detached from each other due to the eccentrically placed pivotal shaft 108. In its rest condition arm 107 extends upwardly and at an acute angle to the sectional plane and is moved by means of intermediate rod 108 about its shaft 106 in the direction of the sectional plane so that filter film 85 is rolled from upper bobbin 87 unto lower bobbin 86. Lower bobbin 86 has a relatively large diameter, so that when arm 107 performs a stroke the contaminated filter portion is completely pulled beyond the tube aperture and the flanges 91 and 92 and the increase in the diameter of the film roll on lower bobbin 86 has only a limited influence on the distance through which later portions of film 85 are displaced. Slotted hole 109 in the connection between arm 107 and intermediate rod 108 ensures that lower bobbin 86 is not rotated until the lower and upper edges of flanges 91 and 92 are completely detached from each other.

For driving the device, computer 9 can be preset by the farmer to one of several rules. The first thereof is that a displacement of film filter 85 occurs each time after a presettable number of milking turns. A second possibility is to cause the displacement of filter 85 as soon as computer 9 determines a limit value which is presettable by the farmer, for the pressure difference between sensors 101 and 102, before and behind filter 85, respectively. The third technical feature consists in that filter 85 is displaced after a presettable number of milking turns, or always after computer 9 has detected that the aforementioned limit value for the pressure difference has been exceeded. In the embodiment in accordance with the invention, a displacement is not performed in all cases until after milk pump 24 has been deactivated after collecting glass 12 has been emptied. The number of displacements is updated by computer 9 and compared to the number of possible displacements preset by the farmer, on the basis of the length of filter film 85. On the basis of this comparison computer 9 supplies, as soon as film 85 threatens to be completely discharged from the upper bobbin 87, a warning signal to indicate that roll of film 85 on bobbins 86 and 87 must be replaced. In the present embodiment, a comparison is always effected prior to a milking round of a cattle stock between the remaining quantity of filter film 85 and the expected number of displacements on the basis of the number of milking runs in the milking round to be started and if it is detected there is not enough filter film 85 for the relevant round a warning signal is also supplied. Filter device 85 is further used to ascertain the degree of contamination of the milk of a completed milking turn and optionally to initiate on the basis thereof a disinfecting rinsing cycle of the milking apparatus. To that end, during discharging of the milk from collecting glass 12 the pressure difference in the milk flow before and behind filter 85 is recorded and checked, with the aid of pressure sensors 101 and 102. If the increase in the pressure difference during pumping of the milk exceeds a predetermined limit value which can be preset by the farmer, the milk is apparently contaminated to such an extent, irrespective of the absolute value of the pressure difference, that a cleaning and disinfecting rinsing cycle and a displacement of milking filter 85 is automatically performed. The oblique configuration of the flanges 91 and 92 has the advantage that surface area of filter 85 is large with respect to the cross-section of a line portion 89 and 90, that the residual drops caused when the flanges are detached from each other are guided in an improved manner and that filter film 85, when it is no longer sufficiently taut, as a result of the force of gravity, automatically remains in position in the guide formed by the hollow profile of flange 91. When because of one of the above-described or other parameters, computer 9 has determined replacement is desired, displacing filter 85 together with associated closure of valve 100 and temporary stoppage of pump 61 are not effected until all the possible operations of emptying the collecting glass 12 and of connecting milking robots 3 in progress, have ended. During the displacement, the start of an operation for emptying collecting glass 12 is obstructed. Thus, the risk that operation of a milking robot 3 is delayed by the displacement of filter 85 is significantly reduced, while the automatic displacement ensures that stoppage of circulating pump 61 is of the shortest possible duration.

The invention is not limited to the features described in the foregoing, but also relates to all the details shown in the drawings. The invention further relates to alternatives in the construction, and/or the methods described insofar they are within the scope of the following claims.

Having disclosed our invention what we claim as new and to be secured by Letters Patent of the United States is:

1. An apparatus for automatically milking an animal comprising a milking robot, a computer system, and a milking reservoir, said milking robot connected to said milking reservoir, said milking reservoir comprising a cooling system, said computer system controlling said milking robot and said cooling system, said cooling system of said milking reservoir after milk has been received therefrom being automatically activated when said computer system detects that a predetermined amount of milk has entered said reservoir via said milking robot.

2. An apparatus as claimed in claim 1 further comprising measuring means located outside said reservoir, said measuring means measuring the amount of milk entering said reservoir via said milking robot, said measuring means being operationally associated with said computer system, wherein said computer system is informed by said measuring means that said measuring means has detected that a predetermined amount of milk has entered said reservoir.

3. An apparatus as claimed in claim 2, wherein said measuring means comprises a milk flow meter associated with said milking robot.

4. An apparatus as claimed in claim 2, further comprising a collecting jar, said collecting jar operationally disposed between said milking robot and said milk reservoir, said collecting jar receiving all milk conveyed from said milking robot before said milk enters said reservoir, said collecting jar comprising a measuring means, and said measuring means comprising a metering device.

5. An apparatus as claimed in claim 1, wherein said milking robot is connected to said milking reservoir via a recirculating line, said recirculating line comprising a pump, said pump comprising a suction connection from said reservoir said pump comprising a discharge connection to said reservoir.

6. An apparatus as claimed in claim 5, further comprising a means for cleaning said reservoir, said reservoir comprising a discharge cock, said means of cleaning said reservoir comprising a cleaning solution, whereby said cleaning solution is received in said reservoir, said cleaning solution being transferred by said pump from said reservoir into said recirculating line, said cleaning solution being discharged from recirculation line into said reservoir, and said cleaning solution being drained from said reservoir through said discharge cock.

7. An apparatus as claimed in claim 5, wherein said recirculating line further comprises a filter and a filter replenishment means, said filter replenishment means performing the function of changing said filter while said recirculating line is pressurized.

8. An apparatus as claimed in claim 5, wherein said recirculating line further comprises two branch lines, each said branch line having a milk filter, a T-valve between said recirculating line and said branch lines directing flow selectively through one of said branch lines.

9. An apparatus as claimed in claim 8, wherein each said branch line comprises a non-return valve, disposed after each said milk filter.

10. An apparatus as claimed in claim 1, wherein said predetermined amount of milk being an amount of milk is a quantity pre-set into said computer system.

11. An apparatus as claimed in claim 1, further comprising timing means, said timing means automatically activating said cooling system after a predetermined amount of time has passed since said milking robot introduces milk into said reservoir.

12. An apparatus as claimed in claim 1, wherein said computer system comprises means of detecting a requirement for said reservoir to be emptied.

13. An apparatus as claimed in claim 1, wherein said milking robot comprises a plurality of teat cups and a milk vent vessel,
said plurality of teat cups providing means of acquiring milk from an animal being milked thereby,
each teat cup of said plurality of teat cups connected to one end of a respective line of a plurality of lines,
each said respective line being connected at its other end to a joint milk line,
said joint milk line connected to said milk vent vessel whereby said milk acquired by said teat cups is discharged into said milk vent vessel via said respective milk line and said joint milk line.

14. An apparatus as claimed in claim 1, wherein said milking robot comprises a teat cup and a milk deaeration unit,
said teat cup connected to a milk line which is connected to said milk deaeration unit.

15. An apparatus as claimed in claim 14, wherein said milk deaeration unit comprises a milk discharge line,
said milk discharge line comprises a valve, said valve controlled by said computer system,
said milk discharge line further comprising a pump, said pump taking suction from said milk deaeration unit via said discharge line.

16. An apparatus as claimed in claim 15, wherein said milking deaeration unit, said valve, and said pump are in close proximity to each other.

17. An apparatus as claimed in claim 15, further comprising a three-way valve,
said pump discharging to said three-way valve,
said three-way valve having a first discharge position and a second discharge position,
said first discharge position associated with a pump and said reservoir whereby said pump transfers fluid therefrom to said reservoir,
said second discharge position associated with said pump and a further line for the transfer of fluid therefrom to said further line.

18. An apparatus as claimed in claim 17, wherein said further line comprises a second three-way valve,
said second three-way valve comprising a first discharge disposition and a second discharge disposition,
said first disposition opening said second three-way valve to a connection to a depot for unwanted milk,
said second disposition position opening said second three-way valve to an additional line having a third three-way valve,
said third three-way valve having a primary discharge position and a secondary discharge position,
said primary discharge position opening said third three-way valve to a further connection to a cleaning fluid reservoir,
said secondary discharge position opening said third three-way valve to a final line for discharging fluid from said apparatus.

19. An apparatus as claimed in claim 14, wherein said milk deaeration unit comprises a connection to a vacuum device, said connection comprising a valve controlled by said computer system.

20. An apparatus as claimed in claim 14, wherein said milk line comprises a shut-off means,
said shut-off means comprising means to block flow through said milk line from said teat cup to said milk deaeration unit,
said shut-off means being controlled by said computer system,
said shut-off means being disposed proximate said teat cup.

21. An apparatus as claimed in claim 20, wherein said milk line comprises a flexible portion,
said shut-off means being disposed on said flexible portion whereby said shut-off means blocks said flow in said milk line from said teat cup to said deaeration unit by acting on the exterior of said milk line.

22. An apparatus as claimed in claim 20, wherein said milk line further comprises a vacuum sensor,
said vacuum sensor being disposed between said teat cup and said shut-off means.

23. An apparatus as claimed in claim 1, further comprising preventive means for preventing the animal being milked by said milking robot until after a time interval commencing immediately after the animal was last milked.

24. An apparatus as claimed in claim 1, wherein said milking robot comprises a plurality of teat cups,
said robot automatically connecting each teat cup of said plurality of teat cups to a respective teat of the animal being milked,
sensor means associated with each said teat cup and communicating to said computer system the duration of milking for each teat of each animal milked,
said computer system controlling said milking robot to initially connect the said teat cup to the teat of the animal being milked having the recorded, historically longest milking time.

25. An apparatus as claimed in claim 1, wherein said milking robot comprises a plurality of teat cups,
each teat cup of said plurality of teat cups being associated with a respective teat of said animal whereby, upon inadvertent decoupling of a teat cup from said respective teat while other said teat cups of said plurality of teat cups are each coupled to their said respective teats, said decoupled teat cup is automatically recoupled its to said respective teat by said milking robot.

26. An apparatus as claimed in claim 1, further comprising two vertical posts, a straight horizontal guide, and a robot arm,
- said straight horizontal guide disposed between said two vertical posts,
- said straight horizontal guide comprising a carrier frame,
- said computer system attached to said carrier guide,
- said robot arm disposed on said carrier guide,
- said robot arm comprising means for moving vertically.

27. An apparatus as claimed in claim 26, wherein said milking robot is attached to a frame, said frame being attached to said posts.

28. An apparatus as claimed in claim 26, further comprising a railing, said railing being detachably connected to said posts.

29. An apparatus as claimed in claim 26, wherein said means for moving said robot arm vertically comprising an adjusting piston/cylinder set, said adjusting piston/cylinder set comprises a pressure differential sensor.

30. An apparatus as claimed in claim 29, wherein said adjusting piston/cylinder set further comprises valves,
- said computer system comprising means for accepting data signals from said pressure differential sensor
- said valves controlled by said computer system whereby
- said computer system controls said valves substantially on a basis of said data signals received by said computer system from said pressure differential sensor.

31. An apparatus as claimed in claim 30, wherein said adjusting piston/cylinder set comprises an interconnecting line, a piston and a cylinder,
- said piston defining a first chamber and a second chamber in said cylinder,
- said first chamber and said second chamber interconnected by said interconnecting line,
- said interconnecting line comprising a non-return valve.

32. An apparatus as claimed in claim 1, wherein said reservoir further comprises discharge means of discharging fluid therein from reservoir,
- said discharge means comprising a discharge cock,
- said discharge cock comprising intercept means for blocking fluid flow through said discharge cock,
- said discharge cock further comprising disengagement means for automatically disengaging said intercept means.

33. An apparatus as claimed in claim 32, wherein said intercept means is controlled by a computer, and said disengagement means comprises a contact element,
- said contact element being slidable and lockable relative to said discharge cock, wherein said contact element is in a locked position in preparation for discharging said fluid from said reservoir,
- said contact element being operative connected with said computer system whereby said contact element, in said locked position, provides a signal to said computer system so that said computer system automatically causes the disengagement of said intercept means.

34. An apparatus for bulk storage of milk obtained from milking an animal comprising a milking reservoir, a level sensor, a computer system and a cooling system,
- said level sensor providing measuring means for measuring a level of said milk in said reservoir,
- said level sensor being in operationally connected to said computer system whereby said level sensor supplies said computer system with a signal,
- said signal being related to said level of said milk,
- said cooling system providing means of removing heat from said milk in said reservoir,
- said computer system activating said cooling system when said computer system detects a predetermined amount of milk has entered said reservoir based on said signal received from said level sensor.

35. An apparatus as claimed in claim 1, wherein said cooling system withdraws from said tank a quantity of heat energy that is a function of the quantity of milk in said reservoir.

36. An apparatus for automatically milking an animal comprising:
- a milking robot, a milk reservoir, a recirculating line, a filter system, and a computer system,
- said milking robot comprising a teat cup, a collecting glass, and a first pump,
    - said teat cup comprising tubing, said tubing connecting said teat cup and said collecting glass,
    - said tubing comprising a first valve means, said first valve means comprising means of selectively allowing or blocking flow through said tubing,
    - said collecting glass comprising a vacuum circuit, said vacuum circuit comprising means of obtaining and maintaining a vacuum in said collecting glass,
    - said first pump comprising a suction part, a discharge part, a first pipe, and a second pipe,
    - said first pipe attached to said suction part and connecting said first pump to said collecting glass,
    - said second pipe attached to said discharge part,
- said milk reservoir comprising a tank, a cooling system and a drain cock,
    - said tank comprising means of confining a liquid,
    - said cooling system comprising means of removing heat energy from the contents of said tank,
    - said drain cock comprising a second valve means and means of draining said liquid from said tank,
    - said second valve means comprising means of selectively allowing or blocking fluid flow through said drain cock,
- said recirculating line comprising a second pump, a third pipe and a fourth pipe,
    - said second pump comprising a suction section and a discharge section,
    - said third pipe connecting said suction section and said tank whereby said second pump removes fluid from said tank,
    - said fourth pipe connecting said discharge section and said tank whereby said second pump discharges fluid into said tank,
    - said fourth pipe connected to said second pipe,
- said filter system comprising a filter,
    - said filter disposed on said apparatus whereby substantially all milk milked from said animal via said teat cup passes through said filter,
- said computer system comprising a computer and a first sensor means, a first signal means, a milk measuring device, a first valve control means, a second valve control means, and a cooling system control means,
    - said first sensor means comprising means of sensing the pressure in said teat cup and signalling data to said computer based upon said pressure,
    - said first signal means comprising means of signalling said computer that said milk reservoir is prepared for draining,
    - said milk measuring device comprising means of measuring an amount of said milk provided from said animal via said teat cup which enters said tank and signalling data to said computer based upon said amount, said first valve control means comprising means of controlling said first valve means whereby said first valve means selectively allows the flow of the fluid through said tubing or blocks said flow of fluid through said tubing based upon said data received by said computer from said first sensor means, said second valve control means comprising control means controlling said second valve means whereby said second valve means selectively allows said fluid flow through said discharge cock or blocks said flow through said discharge cock based upon said signal received by said computer from said first signalling means, said cooling system control means comprising temperature regulation means that thermally controls said cooling system whereby selectively more or less of said heat energy is removed from said contents of said milk reservoir based upon said data received from said milk measuring device.

37. An apparatus as claimed in claim 36 further comprising a sanitation circuit, said sanitation circuit comprising
a cleaning solution vessel,
said cleaning solution vessel comprising retention means containing a cleaning solution, said cleaning solution vessel further comprising a fill pipe, a suction pipe and a drain pipe, said fill pipe comprising first water source means for introducing water within a first range of temperature into said cleaning solution vessel, a second water source means for introducing water with second range of temperatures into said cleaning solution vessel, base means of introducing an alkaline cleaning fluid into said cleaning solution vessel, acid means of introducing an acidic cleaning fluid into said cleaning solution vessel, and a fluid source means for introducing recirculated cleaning fluid into said cleaning solution vessel, said first water source means comprising a third valve means, said third valve means selectively preventing or allowing the introduction of said water of said first range of temperatures into said cleaning solution vessel, said second water source comprising a fourth valve means, said fourth valve means selectively preventing or allowing introduction of said water of said second range of temperature into said cleaning solution vessel, said fluid source comprising a fifth valve means, said fifth valve means selectively preventing or allowing introduction of said recirculated cleaning fluid into said cleaning solution vessel, said suction pipe comprising means of conveying said cleaning solution from said cleaning solution vessel to said collecting glass, said suction pipe further comprises a pipe-line, said pipe-line comprises a sixth valve means and an end removably attachable to said teat cup whereby said cleaning solution moves to said collecting glass via said teat cup, said sixth valve means comprising means of selectively preventing or allowing fluid flow through said pipe-line, said drain pipe comprising drain means for removing fluid from said cleaning solution vessel, said computer system further comprises a third valve control means, a fourth valve control means, a fifth valve control means, and a sixth valve control means, for respectively controlling said third valve means, said fourth valve means, said fifth valve means, and said sixth valve means.

38. An apparatus as claimed in claim 36 wherein said filter system further comprises:

a first relatively pivotal pipe having a first flange on one end thereof;

a second relatively pivotal pipe having a second flange on one end thereof, said second flange substantially mating with said first flange, said filter disposed between said first flange and said second flange, said filter filtering substantially all milk which is received by said teat cup from the animal being milked, further valve means selectively to allow or prevent milk to flow through said filter, said further valve means controlled by said computer system, filter replacement means for automatically replacing said filter, said filter replacement means being controlled by said computer system causing said first flange and said second flange to move relative to each other and automatically.

* * * * *